United States Patent
Park et al.

(10) Patent No.: US 11,189,268 B2
(45) Date of Patent: Nov. 30, 2021

(54) METHOD AND APPARATUS FOR SELECTING VOICE-ENABLED DEVICE AND INTELLIGENT COMPUTING DEVICE FOR CONTROLLING THE SAME

(71) Applicant: LG ELECTRONICS INC., Seoul (KR)

(72) Inventors: Heewan Park, Seoul (KR); Donghoon Yi, Seoul (KR); Yuyong Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 164 days.

(21) Appl. No.: 16/557,868

(22) Filed: Aug. 30, 2019

(65) Prior Publication Data
US 2019/0385594 A1   Dec. 19, 2019

(30) Foreign Application Priority Data
Jun. 11, 2019   (KR) .......................... 10-2019-0068955

(51) Int. Cl.
*G10L 15/08* (2006.01)
*H04W 52/02* (2009.01)
*G10L 15/22* (2006.01)

(52) U.S. Cl.
CPC ............ *G10L 15/083* (2013.01); *G10L 15/22* (2013.01); *H04W 52/0229* (2013.01); *G10L 2015/088* (2013.01); *G10L 2015/223* (2013.01); *G10L 2015/225* (2013.01)

(58) Field of Classification Search
CPC ........ G10L 15/083; G10L 15/22; G10L 15/28
USPC .......................................................... 704/251
See application file for complete search history.

(56) References Cited

U.S. PATENT DOCUMENTS

| 8,898,284 | B2* | 11/2014 | Qi ........................ H04L 41/0823 709/224 |
| 10,425,780 | B1* | 9/2019 | Devaraj ................ H04W 8/186 |
| 10,425,781 | B1* | 9/2019 | Devaraj ................ H04W 8/186 |
| 10,529,318 | B2* | 1/2020 | Kurata ..................... G06N 3/08 |

(Continued)

FOREIGN PATENT DOCUMENTS

| KR | 1020180039135 | 4/2018 |
| KR | 1020180125241 | 11/2018 |

*Primary Examiner* — Susan I McFadden
(74) *Attorney, Agent, or Firm* — Lee, Hong, Degerman, Kang & Waimey PC

(57) ABSTRACT

A method and apparatus for selecting a voice-enabled device are disclosed. In the voice-enabled device selecting method, when recognition situation information is obtained from one device, voice signals may be obtained from that device and second devices registered to the same account as that device, and a device that will respond to the wakeup word may be selected based on the voice signals. Thus, even if the closest device the user intends to activate is not able to recognize a wakeup word spoken by the user due to the device's microphone position, that device may be selected as a voice-enabled device. At least one of a voice enable device selecting apparatus, an intelligent computing device, an IoT device, and a server controlling the voice enable device selecting apparatus may be associated with an artificial intelligence (AI) module, an unmanned aerial vehicle (UAV) (or drone), a robot, an augmented reality (AR) device, a virtual reality (VR) device, and a device related to a 5G service.

10 Claims, 14 Drawing Sheets

(56) References Cited

U.S. PATENT DOCUMENTS

| | | | |
|---|---|---|---|
| 10,531,157 B1* | 1/2020 | Loritsch | G06F 3/165 |
| 10,593,346 B2* | 3/2020 | Van Gysel | G10L 15/16 |
| 10,616,726 B1* | 4/2020 | Freeman, II | H04W 4/025 |
| 10,623,246 B1* | 4/2020 | Iyer | H04L 12/2825 |
| 10,636,430 B2* | 4/2020 | Park | G06F 21/32 |
| 10,643,605 B2* | 5/2020 | Ryu | G10L 15/01 |
| 10,706,840 B2* | 7/2020 | Sak | G06N 3/02 |
| 10,795,541 B2* | 10/2020 | Gruber | G06Q 10/1097 |
| 10,846,589 B2* | 11/2020 | Patel | G06N 3/0472 |
| 10,880,895 B2* | 12/2020 | Gordaychik | H04W 8/22 |
| 10,909,983 B1* | 2/2021 | Peng | G10L 15/1815 |
| 10,964,317 B2* | 3/2021 | Chang | G06F 3/167 |

\* cited by examiner

【FIG. 1】
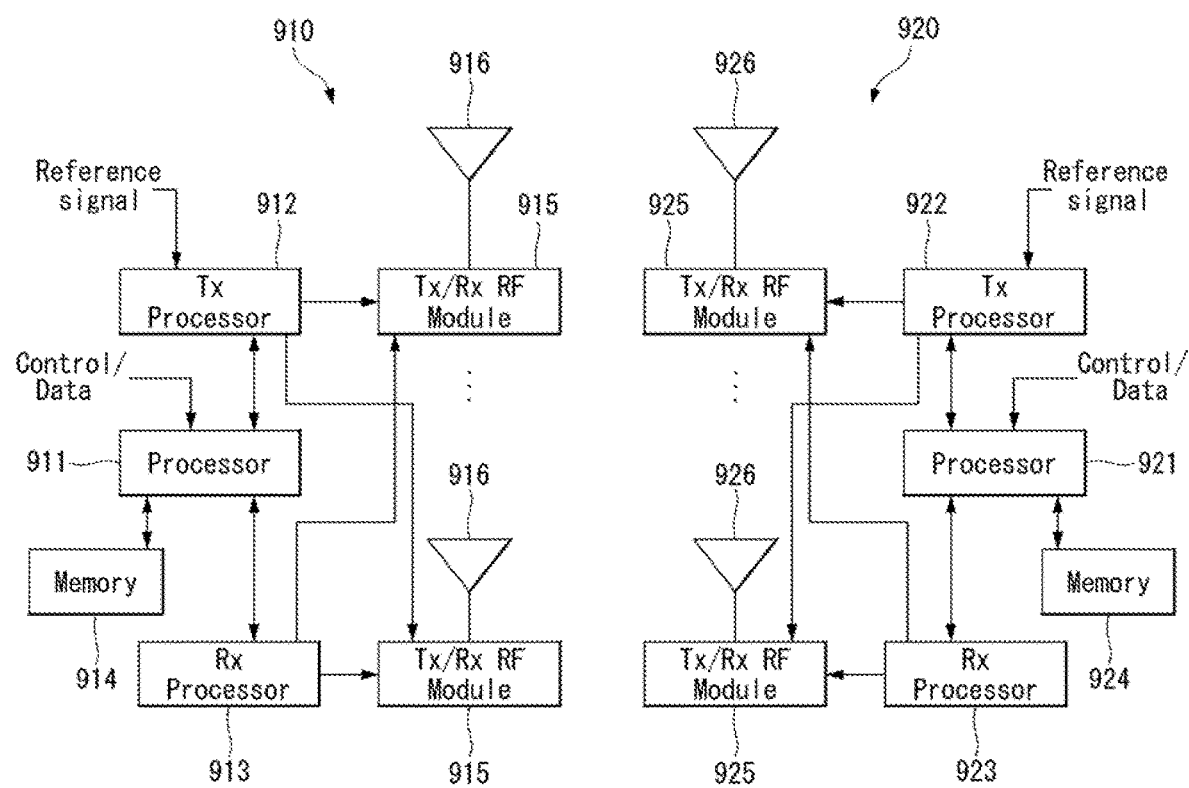

[FIG. 2]
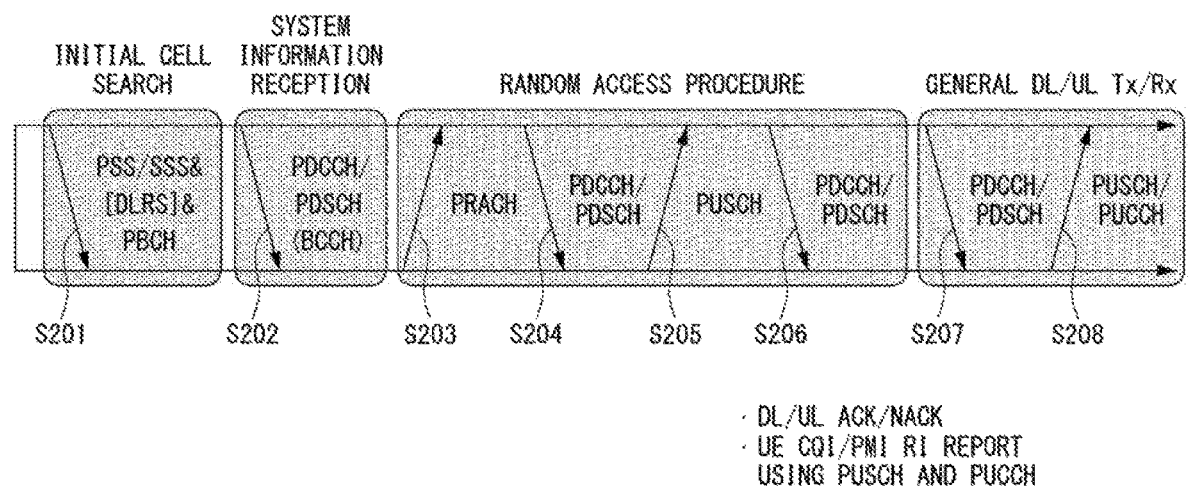

[FIG. 3]
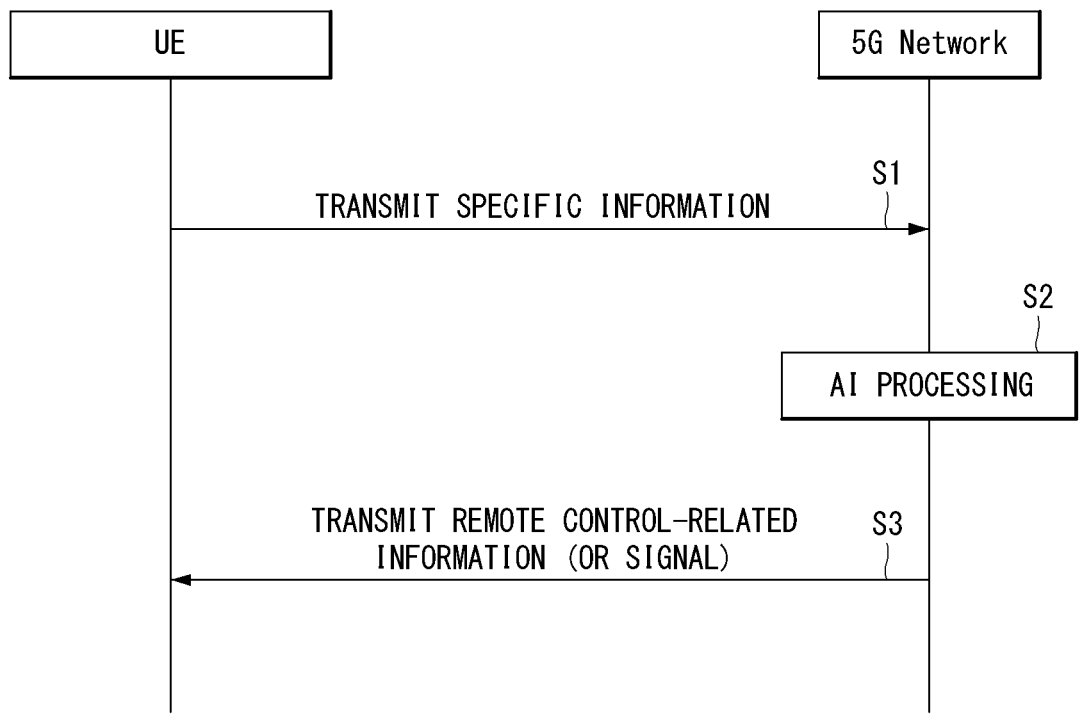

[FIG. 4]
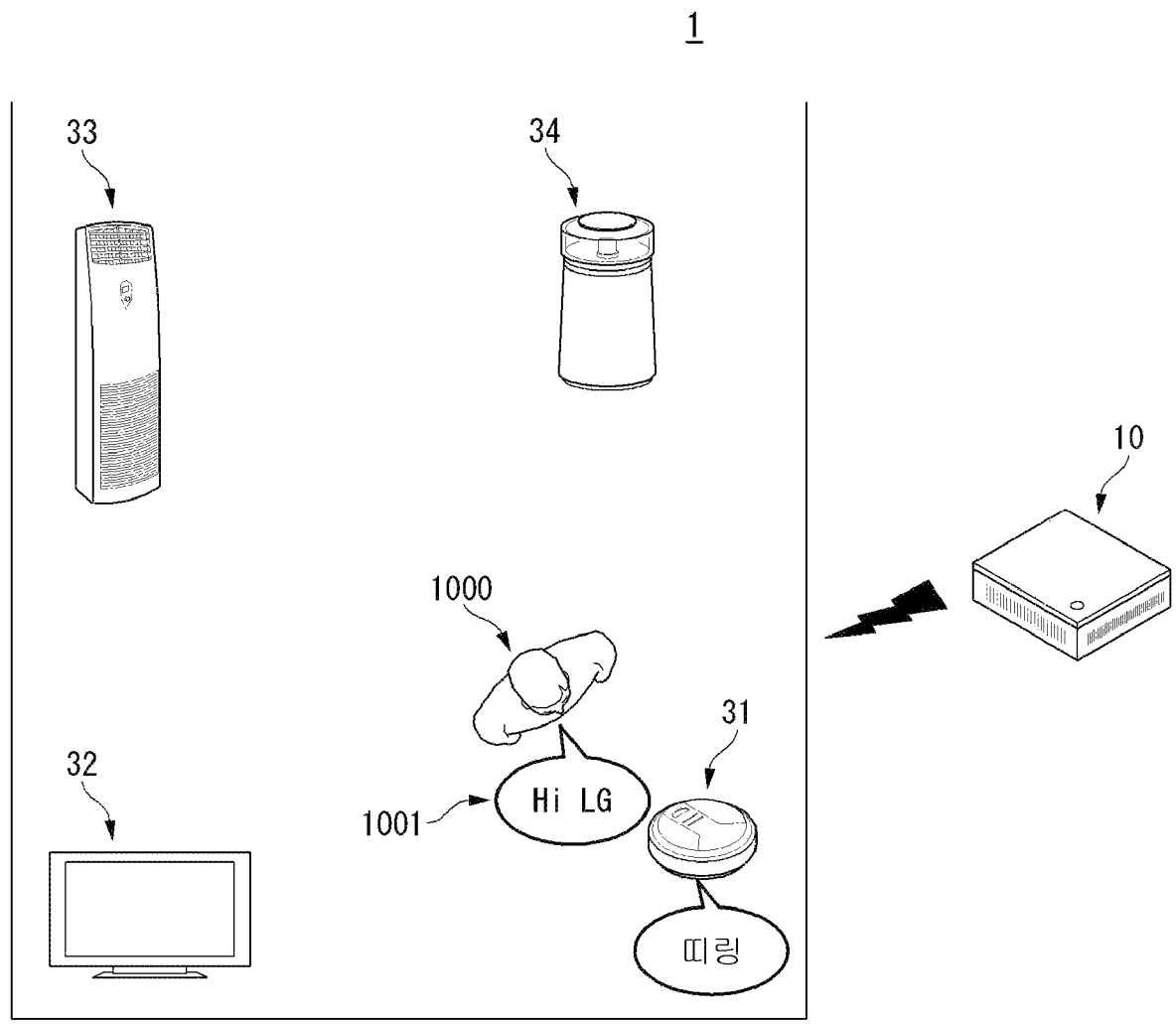

[FIG. 5]
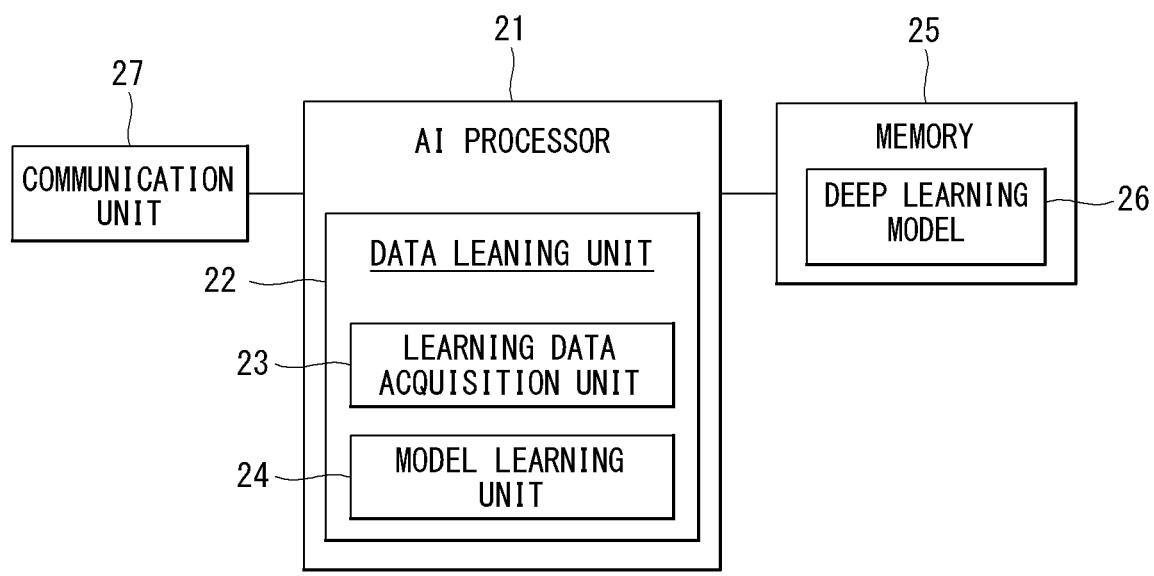

[FIG. 6]
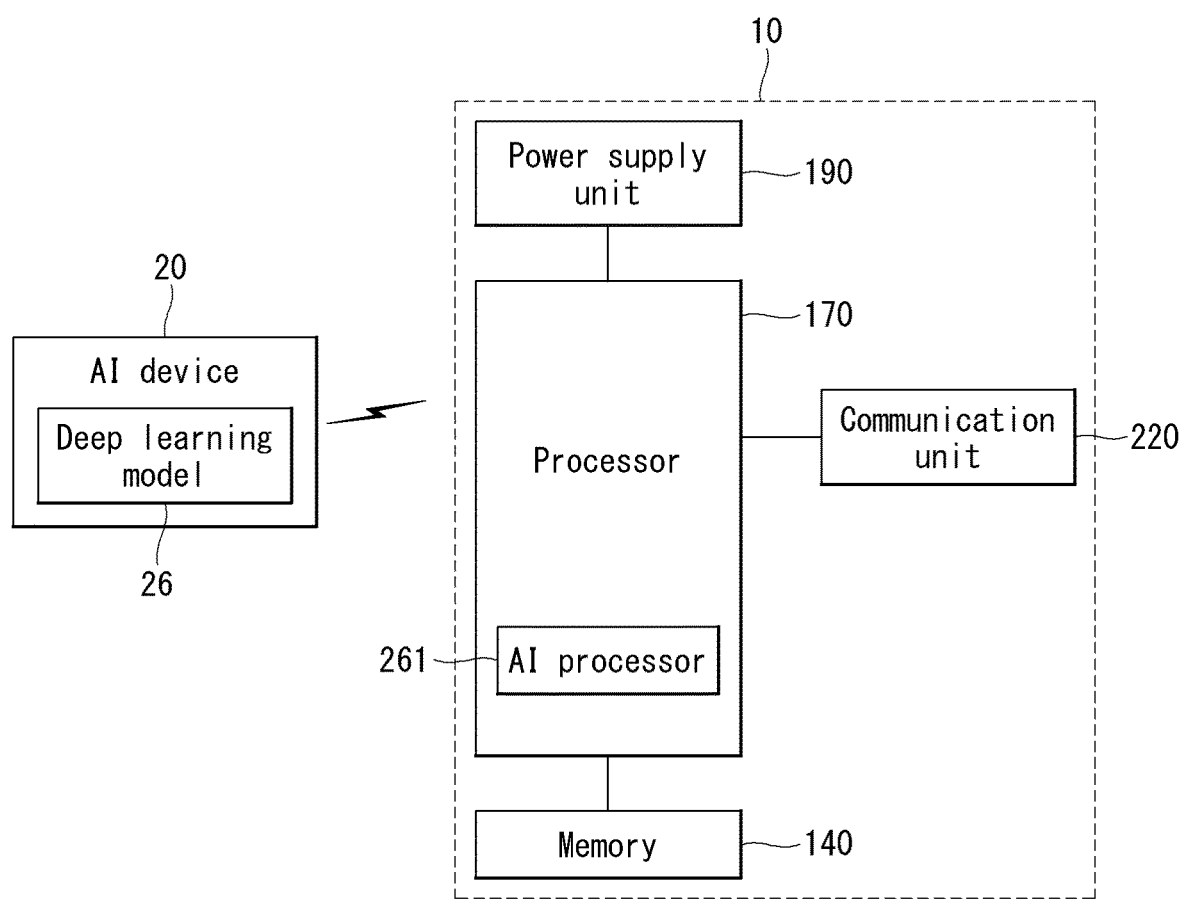

[FIG. 7]
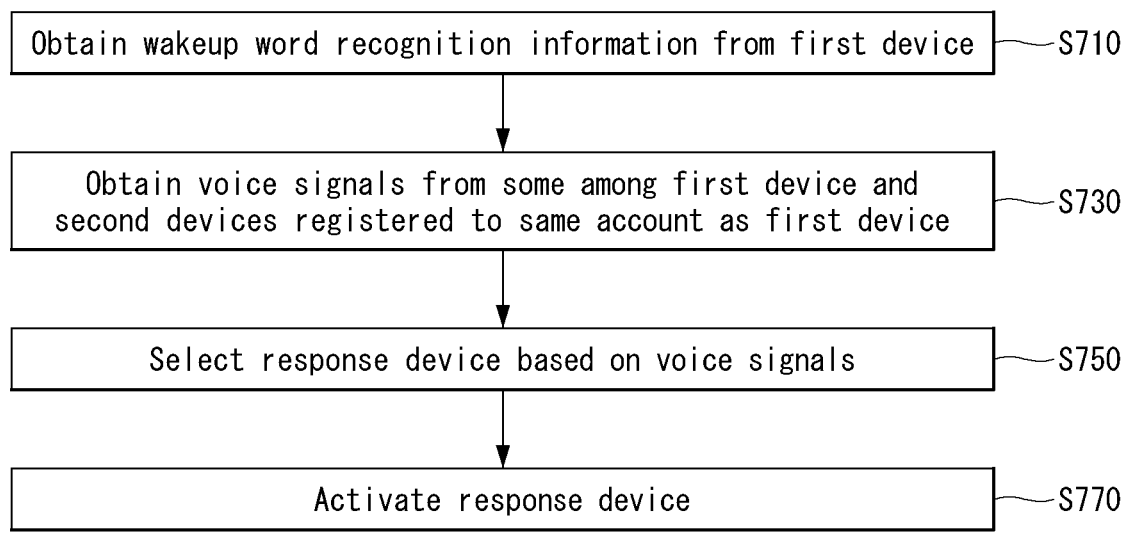

[FIG. 8]
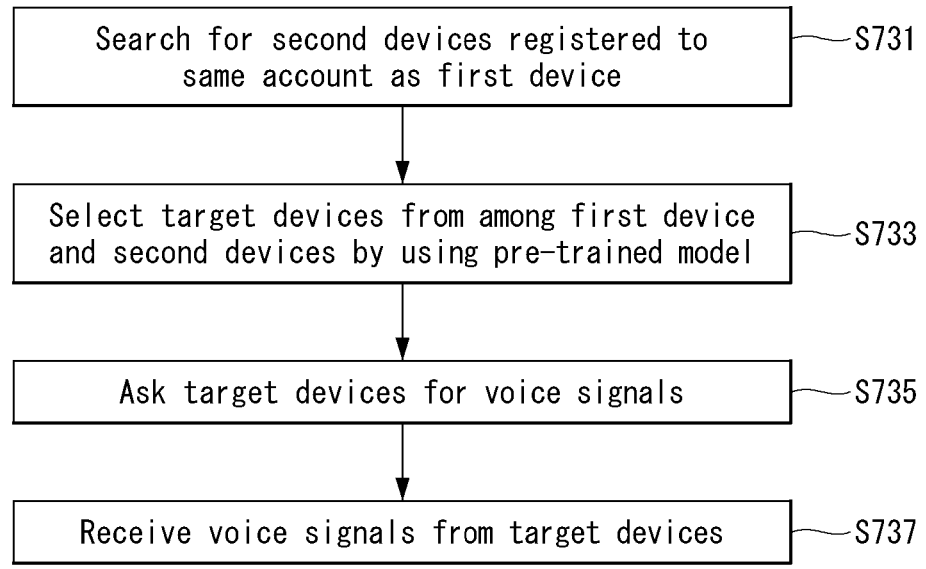

[FIG. 9]
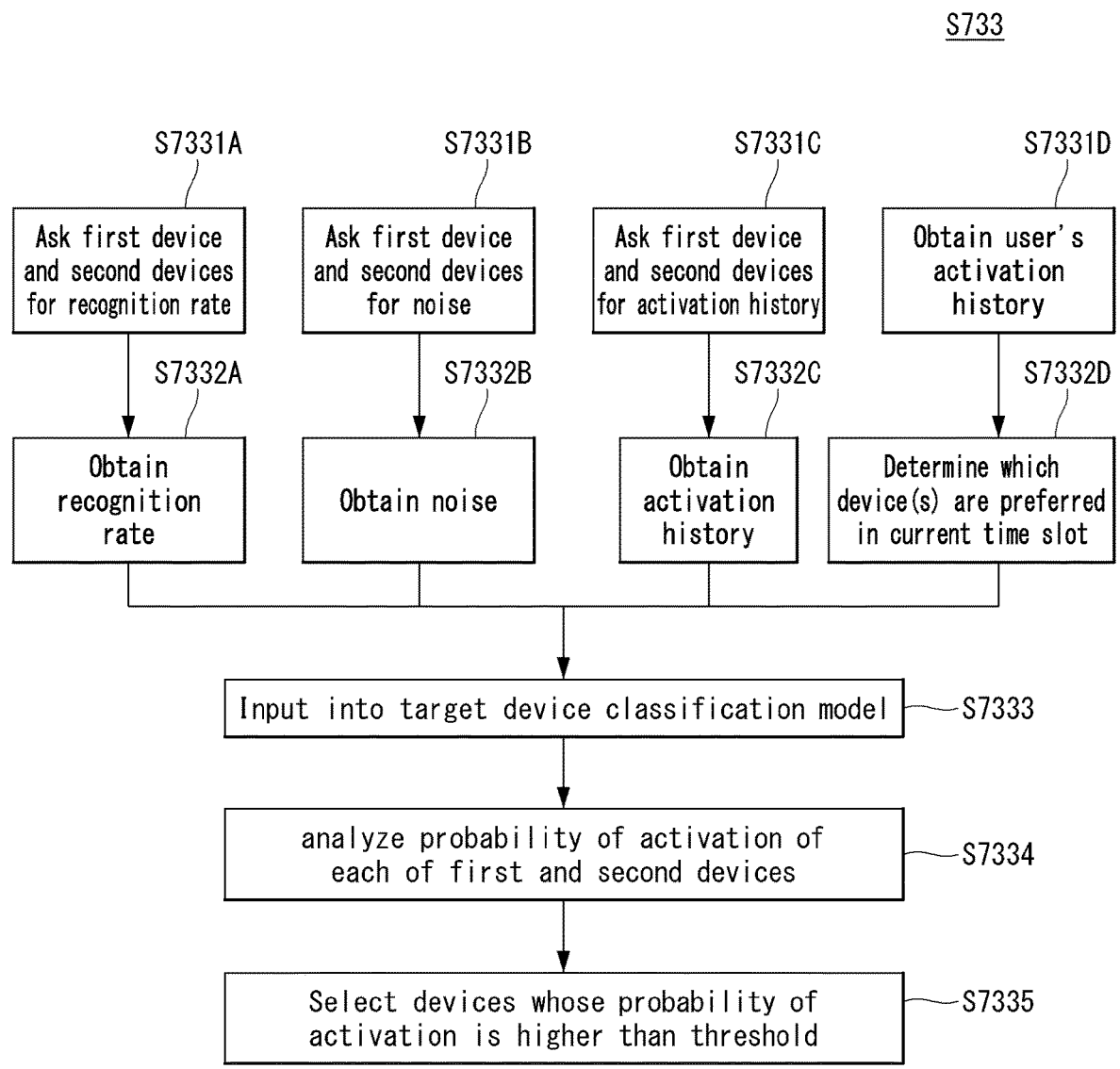

[FIG. 10]
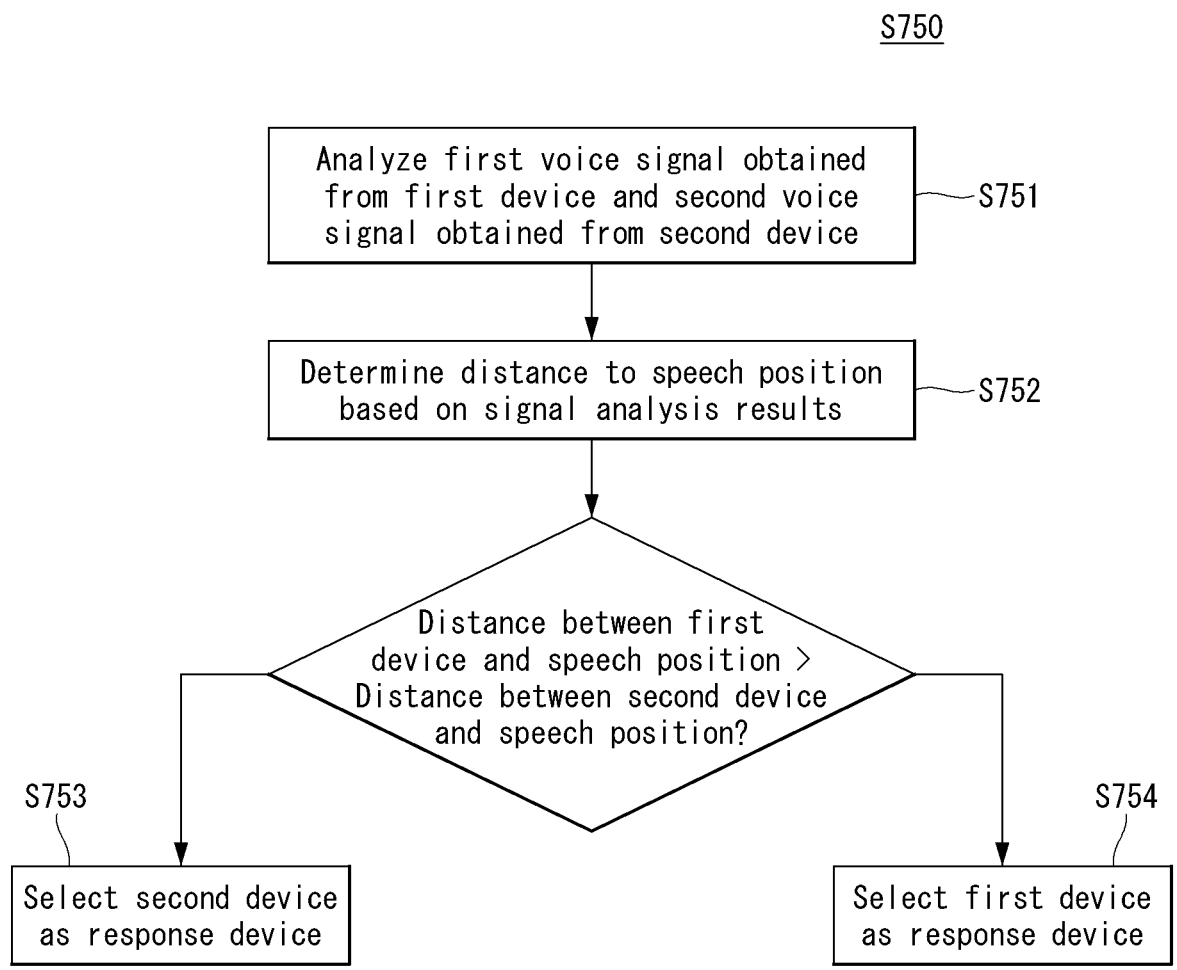

[FIG. 11]
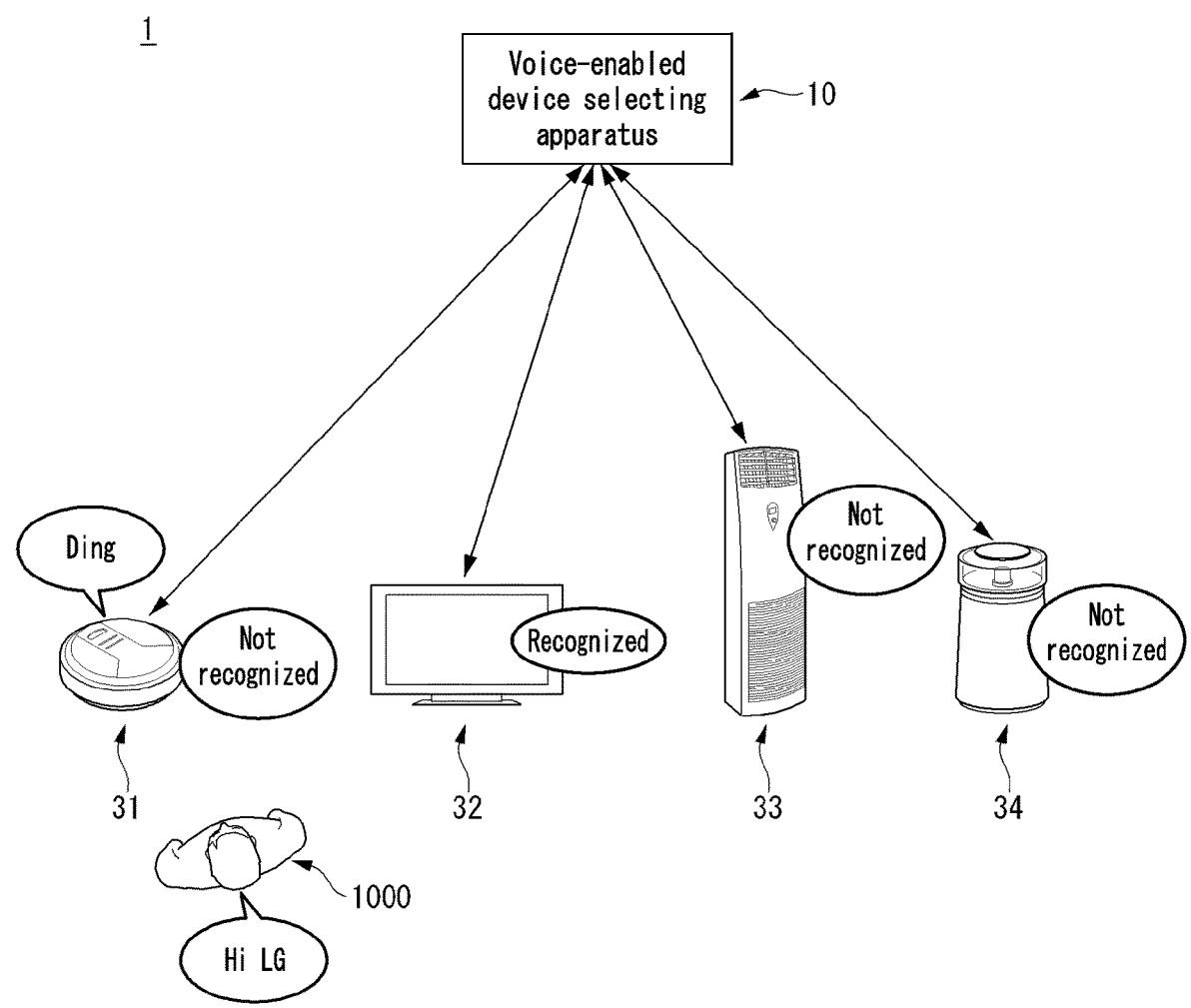

[FIG. 12]
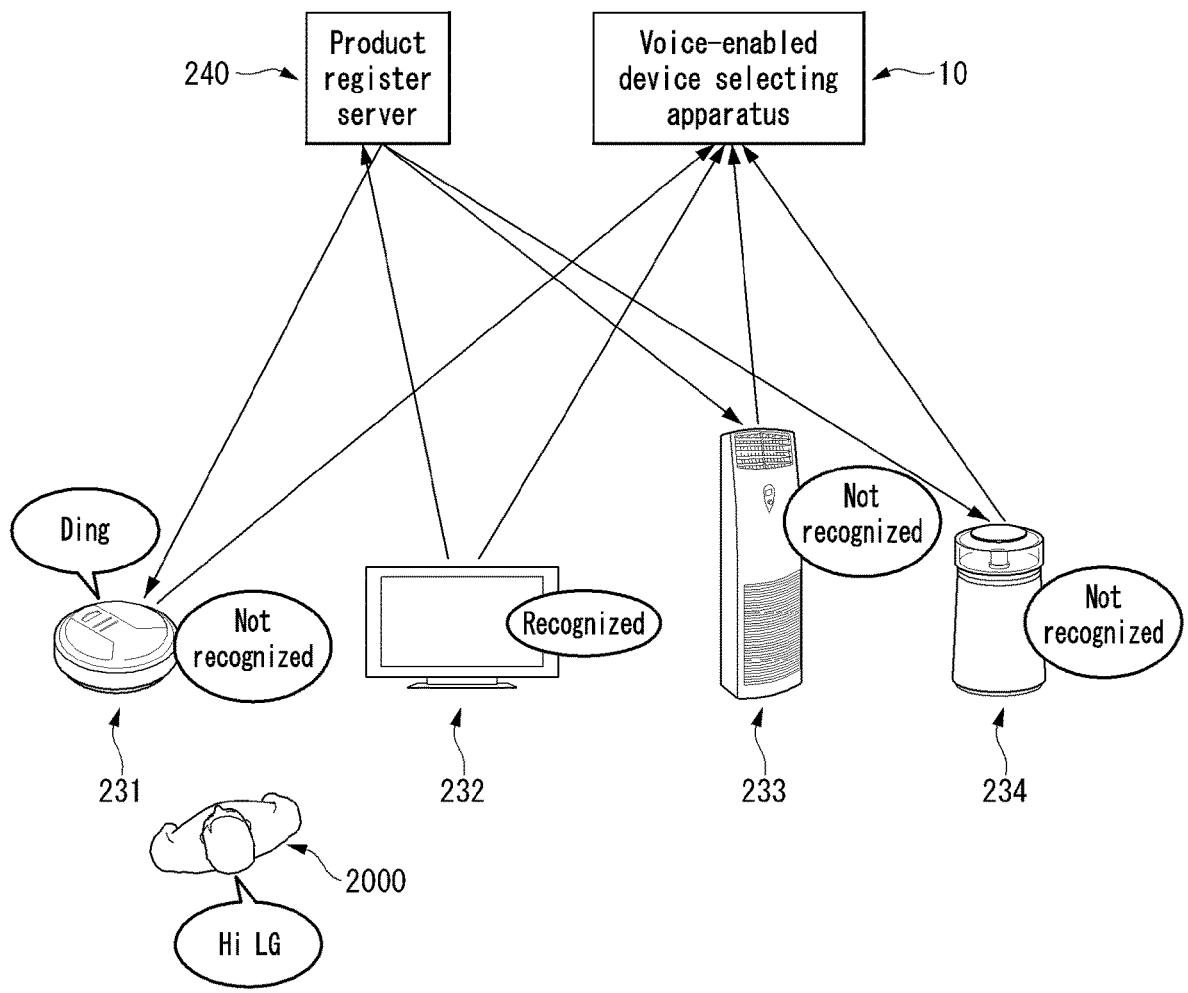

[FIG. 13]
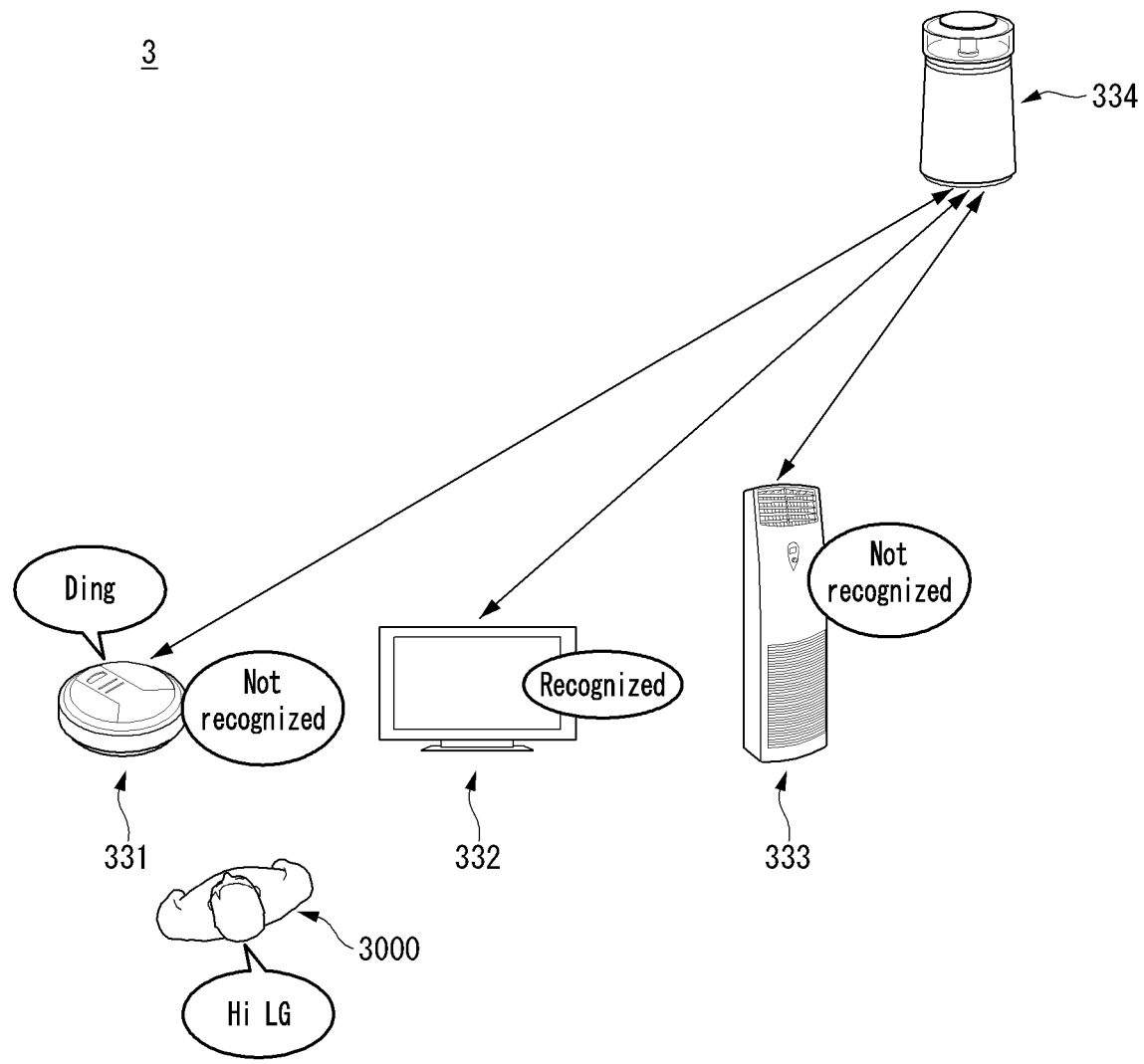

[FIG. 14]
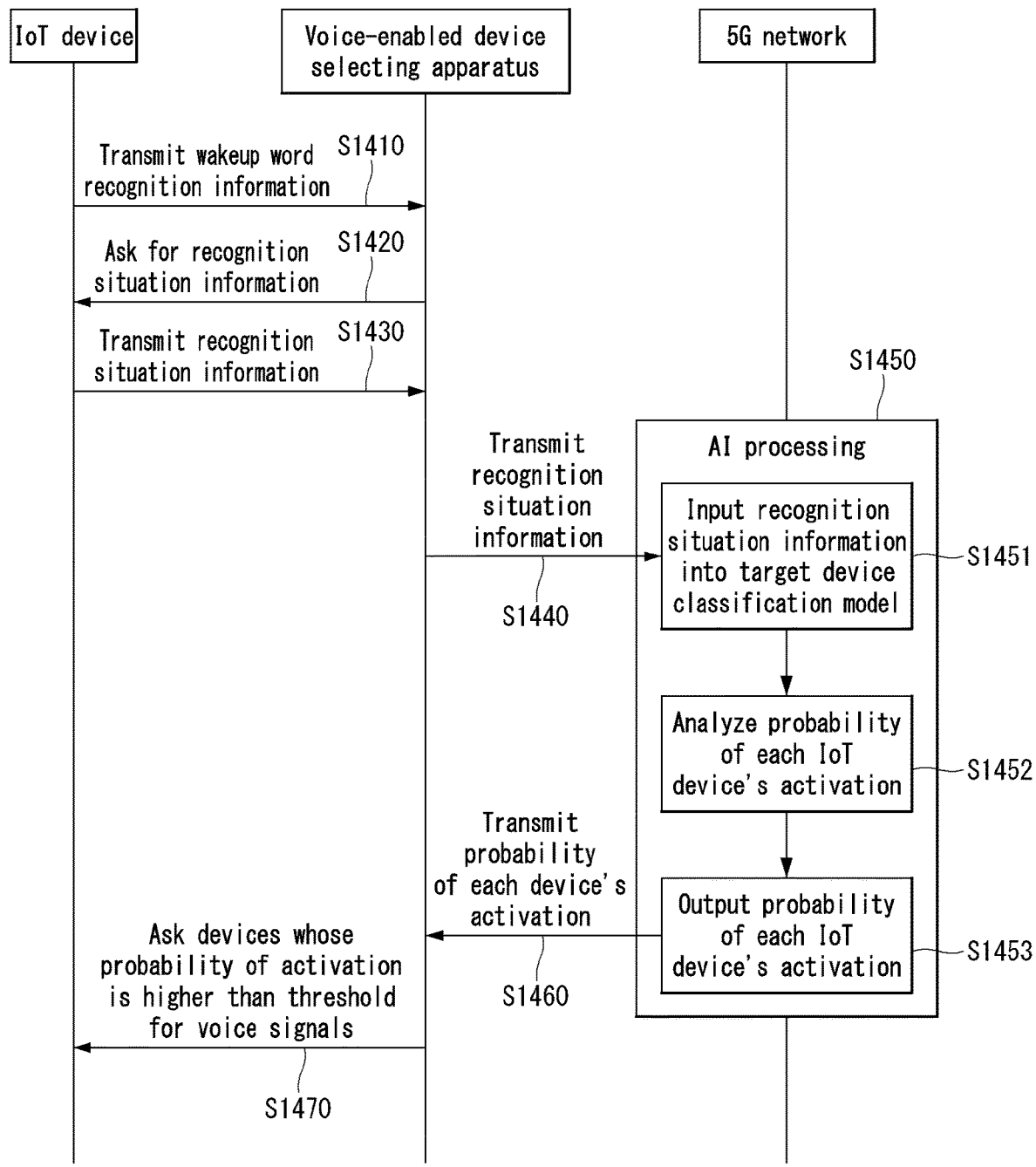

METHOD AND APPARATUS FOR SELECTING VOICE-ENABLED DEVICE AND INTELLIGENT COMPUTING DEVICE FOR CONTROLLING THE SAME

CROSS-REFERENCE TO RELATED APPLICATION(S)

Pursuant to 35 U.S.C. § 119(a), this application claims the benefit of earlier filing date and right of priority to Korean Patent Application No. 10-2019-0068955, filed on Jun. 11, 2019, the contents of which are hereby incorporated by reference herein in its entirety.

BACKGROUND OF THE INVENTION

Field of the Invention

The present invention relates to a method and apparatus for selecting a voice-enabled device and, more particularly, to a voice-enabled device selecting method and apparatus that reflect the distance from a speech position.

Related Art

A voice-enabled device is a device for performing a voice recognition function. Driven by the development of mobile communication technology, various technologies are being developed to recognize a wakeup word spoken by a user in the form of voice signal (pulse code modulation (PCM)) and controls IoT (Internet of Things) devices using voice signal recognition results.

For example, if the user speaks a wakeup word (e.g., "Hi LG") for activating an IoT device, the IoT devices around the user receive the wakeup word and recognize it in the form of voice signal. Each IoT device analyzes a corresponding voice signal, and, if the voice signal is determined to be a wakeup signal for activating them based on the analysis result, they prepare to receive other commands from the user—that is, the corresponding IoT device is activated (or waken up).

In traditional cases, when a plurality of IoT devices that are in the range in which they can recognize a wakeup word from the user transmit a voice signal to a server as a result of wakeup word recognition, the server selects a voice-enabled device that will respond, from among the devices that have transmitted a voice signal.

However, some of the IoT devices located in the home may not recognize the user's speech unlike the other devices, because of their microphone's position. Moreover, devices having lower sensitivity than other devices may not be able to recognize the user's speech. Further, devices having a different recognition model/algorithm than other devices may not be able to recognize the user's speech as a wakeup signal.

In the above case, the device closest to the user's position (closest to the speech position) may fail to recognize the wakeup word unlike the other devices that have succeeded in recognizing the wakeup word, due to the differences in microphone position/sensitivity/recognition model. In this instance, the server cannot receive a voice signal from that device and cannot activate it.

SUMMARY OF THE INVENTION

An object of the present invention is to meet the needs and solve the problems.

Another aspect of the present invention is to select the right voice-enabled device a user intends to activate.

An exemplary embodiment of the present invention provides a method for a voice-enabled device to select a voice-enabled device, the method including: obtaining information indicating that a first device has recognized a wakeup word; obtaining at least one voice signal recognized by at least one among the first device and second devices registered to the same account as the first device; and selecting a device that will respond to the wakeup word based on the at least one voice signal.

The selecting of the voice-enabled device may include selecting the device closest to the position where the wakeup word is spoken by analyzing the at least one voice signal.

The obtaining of a voice signal(s) may include selecting at least one device to ask for a voice signal from among the first and second devices by using a pre-trained classification model.

The obtaining of a voice signal(s) may include: obtaining the probability of activation of each of the first and second devices by using the classification model; and selecting at least one device to ask for a voice signal from among the first and second devices based on the probability of activation.

The probability of activation may be obtained by applying recognition situation information related to the first device, the second devices, and the user's account who has spoken the wakeup word.

The recognition situation information may include at least one of the following: information on the recognition rate for a voice signal recognized by each of the first and second devices; information on noise contained in the voice signal recognized by each of the first and second devices; information on the activation history of each of the first and second devices; and information on the user's activation history.

The obtaining of the probability of activation may include receiving the probability of activation from a 5G network to which the voice-enabled device selecting apparatus is connected.

The method may further include receiving, from the 5G network, downlink control information, DCI, which is used to schedule the transmission of the recognition situation information obtained by the voice-enabled device selecting apparatus, wherein the recognition situation information is transmitted to the 5G network based on the DCI.

The method may further include performing an initial access procedure with the 5G network based on a synchronization signal block, SSB, wherein the recognition situation information is transmitted to the 5G network via a PUSCH, and the SSB and the DM-RS of the PUSCH are quasi co-located with QCL type D.

The method may further include controlling a communication module to transmit the recognition situation information to an AI processor included in the 5G network; and controlling the communication module to receive AI-processed information from the AI processor, wherein the AI-processed includes the probability of activation.

Another exemplary embodiment of the present invention provides an apparatus for selecting a voice-enabled device, the apparatus including: a communication module for obtaining information indicating that a first device has recognized a wakeup word; and a processor for controlling the communication module to obtain at least one voice signal recognized by at least one among the first device and second devices registered to the same account as the first device and for selecting a device that will respond to the wakeup word based on the at least one voice signal.

The processor may select the device closest to the position where the wakeup word is spoken by analyzing the at least one voice signal.

The processor may select at least one device to ask for a voice signal from among the first and second devices by using a pre-trained classification model.

The processor may obtain the probability of activation of each of the first and second devices by using the classification model, and selects at least one device to ask for a voice signal from among the first and second devices based on the probability of activation.

The probability of activation may be obtained by applying recognition situation information related to the first device, the second devices, and the user's account who has spoken the wakeup word.

The recognition situation information may include at least one of the following: information on the recognition rate for a voice signal recognized by each of the first and second devices; information on noise contained in the voice signal recognized by each of the first and second devices; information on the activation history of each of the first and second devices; and information on the user's activation history.

The processor may connect the voice-enabled device selecting apparatus to a 5G network through the communication module, and receive the probability of activation from the 5G network.

The communication module may receive, from the 5G network, downlink control information, DCI, which is used to schedule the transmission of the recognition situation information, wherein the processor transmits the recognition situation information to the 5G network based on the DCI.

Another exemplary embodiment of the present invention provides an intelligent computing device that controls a voice-enabled device selecting apparatus, the intelligent computing device including: a communication module provided inside the voice-enabled device selecting apparatus; and a memory having instructions executable by the processor, wherein the instructions allow the processor to obtain information indicating that a first device has recognized a wakeup word by controlling the communication module, obtain at least one voice signal recognized by at least one among the first device and second devices registered to the same account as the first device, and select a device that will respond to the wakeup word based on the at least one voice signal.

The processor may select the device closest to the position where the wakeup word is spoken by analyzing the at least one voice signal.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 shows a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 is a view showing an IoT system according to an exemplary embodiment of the present invention.

FIG. 5 shows a block diagram of an AI device that may be applied to one embodiment of the present invention.

FIG. 6 shows an exemplary block diagram of a voice enable device selecting apparatus according to an embodiment of the present invention.

FIG. 7 is a flowchart showing a method for selecting a voice-enabled device according to an exemplary embodiment of the present invention.

FIG. 8 is a flowchart for explaining an example of obtaining voice signals from some of a plurality of IoT devices according to an exemplary embodiment of the present invention.

FIG. 9 is a flowchart for explaining an example of selecting some of found devices as target devices by using AI processing according to an exemplary embodiment of the present invention.

FIG. 10 is a flowchart for explaining an example of selecting a voice-enabled device by using an obtained voice signal according to an exemplary embodiment of the present invention.

FIG. 11 shows an IoT system according to an exemplary embodiment of the present invention.

FIG. 12 shows an IoT system according to another exemplary embodiment of the present invention.

FIG. 13 shows an IoT system according to yet another exemplary embodiment of the present invention.

FIG. 14 is a flowchart showing an AI processing process between a 5G network and a voice-enabled device selecting apparatus according to an exemplary embodiment of the present invention.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the OSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to "beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3)

extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

In the specification below, a home IoT server may be defined as a voice-enabled device selecting apparatus for selecting a voice-enabled device, and a home IoT device may be defined as a voice recognition device for recognizing a wakeup word. The wakeup word may be defined as a user's speech for activating a specific IoT device.

FIG. 4 is a view showing an IoT system according to an exemplary embodiment of the present invention.

As shown in FIG. 4, according to the exemplary embodiment of the present invention, the IoT system 1 may include a plurality of IoT devices 31, 32, 33, and 34 in a home where a user 1000 is located, and a voice-enabled device selecting apparatus 10 which selects and activates a voice-enabled device that will respond to a wakeup word ("Hi LG") from the user 1000.

Each IoT device may perform wireless communication with the voice-enabled device selecting apparatus 10 over the aforementioned 5G network. Moreover, each IoT device may perform wireless communication with one another over the 5G network. That is, each IoT device and the voice-enabled device selecting apparatus may transmit and receive data over the 5G network.

Each IoT device may be registered to at least one user account. Also, at least some of the IoT devices may be registered to a single user account. For example, while a smart TV 32 and an air conditioner 33 are registered to a first user account, an air purifier 34 and a speaker 31 may be registered to a second user account.

Each IoT device may recognize a wakeup word from the user 1000 in the form of voice signal and output a response ("ding") to the recognized voice signal. Meanwhile, when the user 1000 speaks a wakeup word, only some 32 of the IoT devices recognize the wakeup word in the form of voice signal, but the other devices 31, 33, and 34 may not be able to recognize it as a voice signal. For example, when the user 1000 speaks the wakeup word "Hi LG", only the smart TV 32, among the IoT devices in the home, may recognize the wakeup word, but the air conditioner 33, air purifier 34, and speaker 31 may not be able to recognize the wakeup word.

Here, each IoT device may recognize a wakeup word which is an analog signal as a voice signal which is a digital signal.

For example, if an IoT device receives a wakeup word but cannot recognize it in the form of voice signal, it can be said that this happens due to a problem with the reception sensitivity of the microphone of the IoT device that has received the wakeup word, a problem with the voice signal recognition rate of the IoT device, and a problem with the IoT device's algorithm for voice signal recognition.

An object of the present invention is to include the non-activated devices 31, 33, and 34, as well as the activated device 32, as optional voice-enable devices from which to select, and to ultimately activate the voice-enabled device 31 the user 1000 wants to activate. Here, the voice-enabled device 31 may be the closest device to the user 1000 or to the speech position of the wakeup word, among the plurality of IoT devices, but is not limited thereto.

For example, the smart TV 32 may transmit, to the voice-enabled device selecting apparatus 10, information (wakeup word recognition information) indicating that it has recognized the wakeup word in the form of voice signal.

Upon obtaining the wakeup word recognition information, the voice-enabled device selecting apparatus 10 may find the user account on which the smart TV 32 which has transmitted the wakeup word recognition information is registered. Here, a list of devices registered to each user account may be stored in the voice-enabled device selecting apparatus 10 or in an external server (e.g., product registration server).

The voice-enabled device selecting apparatus 10 may see at least one device (e.g., the air conditioner 33 and the speaker 31) included in the list of devices registered to the user's account where the smart TV 32 is registered.

Subsequently, the voice-enabled device selecting apparatus 10 may ask at least one between the air conditioner 33 and speaker 31 registered to the same user account, as well as the smart TV 32, for a voice signal each IoT device has recognized.

For example, the voice-enabled device selecting apparatus 10 may ask the smart TV 32, air conditioner 33, and/or speaker 31 for voice signals the smart TV 32, air conditioner 33, and/or speaker 31 have recognized, in the time slot during which the smart TV 32 has recognized the wakeup word.

In response to this, the air conditioner 33 and speaker 31, which have not recognized the wakeup word in the form of voice signal, as well as the smart TV 32 which has recognized the wakeup word in the form of voice signal, may transmit the voices signals recognized by each device to the voice-enabled device selecting apparatus 10 in the corresponding time slot.

The voice-enabled device selecting apparatus 10 may analyze the voice signals received from each device, select the closest device 31 to the speech position of the wakeup word as a voice-enabled device, and transmit an activation request to the voice-enabled device 31 (or activate it).

FIG. 5 shows a block diagram of an AI device that may be applied to one embodiment of the present invention.

The AI device 20 may include an electronic device including an AI module capable of performing AI processing or a server including the AI module. In addition, the AI device 20 may be included in at least a part of the voice enable device selecting apparatus 10 illustrated in FIG. 4 and may be provided to perform at least some of the AI processing together.

The AI processing may include all operations related to the control of the voice enabled device selection apparatus 10 shown in FIG. 4. For example, the voice enabled device selection apparatus 10 may perform processing/decision and control signal generation by AI processing sensing data or acquired data transmitted from each IoT device. Also, for example, the voice enable device selection apparatus 10 may perform AI control of data received through the communication unit to perform control of the voice enable device selection apparatus.

The AI device 20 may be a client device that directly uses the AI processing result or may be a device in a cloud environment that provides the AI processing result to another device.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25. In particular, the AI processor 21 may train a neural network for recognizing data related to the voice-enabled device selecting apparatus. For example, the AI processor 21 may recognize each IoT device's recognition situation information (e.g., each device's recognition rate, each device's noise, each device's activation history, and the user's activation history) obtained by the voice-enabled device selecting apparatus and train a neural network for classifying the probability of each IoT device's activation. In this case, the neural network for outputting estimated noise information may be designed to simulate the human's brain structure on a computer, and may include a plurality of network nodes having weight and simulating the neurons of the human's neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice output, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtained learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data obtaining unit 23 and a model learning unit 24.

The learning data acquisition unit 23 may obtain training data for a neural network model for classifying and recognizing data. For example, the learning data acquisition unit 23 may obtain microphone detection signal to be input to the neural network model and/or a feature value, extracted from the message, as the training data.

The model learning unit 24 can perform learning such that a neural network model has a determination reference about how to classify predetermined data, using the obtained learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor may pre-process an obtained operating state so that the obtained operating state may be used for training for recognizing estimated noise information. For example, the learning data preprocessor may process an obtained operating state in a preset format so that the model training unit 24 may use obtained training data for training for recognizing estimated noise information.

Furthermore, the training data selection unit may select data for training among training data obtained by the learning data acquisition unit 23 or training data pre-processed by the preprocessor. The selected training data may be provided to the model training unit 24. For example, the training data selection unit may select only data for a syllable, included in a specific region, as training data by detecting the specific region in the feature values of an operating state obtained by the voice enable device selecting apparatus 10.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

The external electronic device may include a voice enable device selection device, a robot, a drone, an AR device, a mobile device, a home appliance, and the like.

For example, when the external electronic device is a voice enable device selection device, the AI device 20 may be defined as an IoT device, another voice enable device selection device, or a 5G network that communicates with the voice enable device selection device. Meanwhile, the AI device 20 may be implemented by being functionally embedded in a processor included in the voice enabled device selection device. In addition, the 5G network may include a server or a module that performs AI processing.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 6 is an exemplary block diagram of a voice output apparatus according to an embodiment of the present invention.

Referring to FIG. 6, the voice enable device selection apparatus 10 may transmit data requiring AI processing to the AI device 20 through a communication unit, and the AI device 20 including the deep learning model 26 may transmit the AI processing result using the deep learning model 26 to the voice enable device selection apparatus 10. The AI device 20 may refer to the contents described with reference to FIG. 5.

The voice enabled device selection apparatus 10 may include a memory 140, a processor 170, and a power supply 190, and the processor 170 may further include an AI processor 261.

The interface unit may include at least one of a communication module, a terminal, a pin, a cable, a port, a circuit, an element, and an apparatus.

The memory 140 is electrically connected to the processor 170. The memory 140 may store basic data for the unit, control data for controlling the operation of the unit, and input/output data. The memory 140 may store data processed by the processor 170. The memory 140 may be configured in at least one of a ROM, a RAM, an EPROM, a flash drive, and a hard drive in hardware. The memory 140 may store various data for operations of the overall voice enabled device selection apparatus 10, such as a program for processing or controlling the processor 170. The memory 140 may be integrated with the processor 170. According to an embodiment, the memory 140 may be classified into sub-components of the processor 170.

The power supply unit 190 may supply power to the voice enabled device selection device 10. The power supply unit 190 receives power from a power source (for example, a battery) included in the voice enable device selection apparatus 10, and supplies power to each unit of the voice enable device selection apparatus 10. The power supply unit 190 may be operated according to a control signal provided from the main ECU 240. The power supply unit 190 may include a switched-mode power supply (SMPS).

The processor 170 may be electrically connected to the memory 140, the interface unit 280, and the power supply unit 190 to exchange signals. The processor 170 may include at least one of application specific integrated circuits (ASICs), digital signal processors (DSPs), digital signal processing devices (DSPDs), programmable logic devices (PLDs), field programmable gate arrays (FPGAs), processors, and controllers, micro-controllers, microprocessors, and electrical units for performing other functions.

The processor 170 may be driven by the power supplied from the power supply 190. The processor 170 may receive data, process data, generate a signal, and provide a signal while the power is supplied by the power supply 190.

The processor 170 may receive information from another electronic device in the voice enabled device selection device 10. The processor 170 may provide a control signal to another electronic device in the voice enabled device selection device 10 through the interface unit.

The voice enabled device selection apparatus 10 may include at least one printed circuit board (PCB). The memory 140, the interface unit, the power supply unit 190, and the processor 170 may be electrically connected to the printed circuit board.

Hereinafter, other electronic devices and the AI processor 261 which are within the voice-enabled device selecting apparatus connected to the interface will be described in more concrete details.

Meanwhile, the voice enabled device selection device 10 transmits the recognition status information received from each IoT device (for example, the recognition rate of each device, the noise around each device, the start history of each device, the start history of the current user, etc.) to the AI device 20 through the communication unit 220, and the AI device 20 may transmit the AI processing data generated by applying the neural network model 26 to the transmitted data to the voice enabled device selection device 10. The voice enable device selection apparatus 10 recognizes information on the activation probability of each IoT device registered in the same user account based on the received AI processing data, and may determine a request target device for requesting a voice signal among IoT devices based on each activation probability.

Meanwhile, the AI processor 261 may create information on the probability of each device's activation by using the recognition situation information transmitted from each IoT device.

According to the exemplary embodiment of the present invention, the communication unit 220 may obtain a voice signal recognized by each IoT device from each IoT device. The communication unit 220 may obtain recognition situation information related to each IoT device. The communication unit 220 may pass the obtained voice signal recognized by each IoT device and the obtained recognition situation information to the processor 170.

According to the exemplary embodiment of the present invention, the processor 170 may calculate the distance between each IoT device and the speech position of the wakeup word, by using a plurality of voice signals passed from the communication unit 220. The processor 170 may determine the closest IoT device to the speech position of the wakeup word (i.e., the device the user intends to activate), based on the distance between each IoT device and the speech position of the wakeup word.

According to the exemplary embodiment of the present invention, when obtaining voice signals from each IoT device, the processor 170 may select a device whose probability of activation is higher than a threshold as a target device to ask for a voice signal, from among at least one device registered to the same user account as the device that has transmitted wakeup word recognition information. For example, the processor 170 may pass each IoT device's recognition rate, noise, and activation history and the user's activation history to a deep learning model 26 of the AI device 20 or to the AI processor 261 in the processor 170 through the communication unit 220. Subsequently, the processor 170 may obtain the probability of each IoT device's activation, which is classified by the deep learning model 26 of the AI device 20 or the AI processor 261 in the processor 170, through the communication unit 220, and create a list of target devices by using the probability of each IoT device's activation. Afterwards, the processor 170 may ask the IoT devices included in the list of target devices for a voice signal recognized by each IoT device.

As above, an overview has been provided of a 5G communication technology needed to implement the apparatus and method for selecting a voice-enabled device according to an exemplary embodiment of the present invention, and of how the 5G communication technology is applied to perform AI processing and transmit and receive AI processing results.

Below, a concrete method for selecting a voice-enabled device based on wakeup word recognition information according to an exemplary embodiment of the present invention will be described with reference to the necessary drawings.

FIG. 7 is a flowchart showing a method for selecting a voice-enabled device according to an exemplary embodiment of the present invention.

As shown in FIG. 7, a voice-enabled device selecting apparatus (e.g., the voice-enabled device selecting apparatus 10 of FIG. 4 and FIG. 6) according to an exemplary embodiment of the present invention may perform the steps S710 to 770 of FIG. 7. A detailed description of this will be given below.

First of all, according to the exemplary embodiment of the present invention, the voice-enabled device selecting apparatus 10 may obtain information (wakeup word recognition information) indicating that a wakeup word from a first device (e.g., the smart TV 32 of FIG. 4), among a plurality of IoT devices in a IoT system 1, has been recognized in the form of voice signal (S710).

For example, when the user (the user 1000 of FIG. 4) speaks a wakeup word ("Hi LG"), only the first device 32 among a plurality of IoT devices 31 through 34 may recognize the wakeup word in the form of voice signal. The voice-enabled device selecting apparatus 10 may receive wakeup word recognition information from the first device 32 which has recognized the wakeup word. Specifically, the processor (e.g., the processor 170 of FIG. 6) of the voice-enabled device selecting apparatus 10 may receive wakeup word recognition information from the first device 32 that the has recognized the wakeup word through a communication unit (e.g., the communication unit 220 of FIG. 6).

Next, according to the exemplary embodiment of the present invention, the voice-enabled device selecting apparatus 10 may obtain voice signal(s) that have been recognized in the corresponding time slot by some among the first device 32 which has transmitted the wakeup word recognition information and the second devices registered to the same account as the first device 32.

For example, the voice-enabled device selecting apparatus 10 may store a list of devices registered for each user in the memory 140 and retrieve the list of devices registered for each user from the memory 140. As another example, the voice-enabled device selecting apparatus 10 may ask a device (e.g., product registration server) external to the voice-enabled device selecting apparatus 10 for a list of devices registered for each user stored in the external device and receive it from the external device. As another example, the voice-enabled device selecting apparatus 10 may be one of the IoT devices in the IoT system 1, in which case the voice-enabled device selecting apparatus 10 may store a list of devices registered for each user in a memory (not shown) inside the IoT device and retrieve the list of devices registered for each user from the memory (not shown).

In other words, the voice-enabled device selecting apparatus 10 may retrieve the list of devices registered for each user from the memory 140, the external device, or a memory inside a IoT device (if the voice-enabled device selecting apparatus is the IoT device), analyze the list of devices registered for each user, and search for at least one second device (e.g., the air conditioner 33, air purifier 34, and/or speaker 31) registered to the same user account as the first device 32 which has transmitted the wakeup word recognition information. Specifically, the processor 170 may receive the list of devices registered for each user from the memory 140, the external device, or a memory inside a IoT device (if the voice-enabled device selecting apparatus is the IoT device) through the communication unit 220.

Next, after searching for the at least one second device 31, 33, and/or 34 registered to the same user account as the first device 32, the voice-enabled device selecting apparatus 10 may select some among the first device 32 and the at least one second device 31, 33, and/or 34 as target devices. For example, the voice-enabled device selecting apparatus 10 may select target devices from among the first device 32 and the at least one second device 31, 33, and/or 34 by using a pre-trained target device classification model. Here, the pre-trained target device classification model may be stored in the memory 140, an AI device (e.g., the AI device 20 of FIG. 5 and FIG. 6), a memory inside a IoT device (if the voice-enabled device selecting apparatus is the IoT device), or a 5G network.

For example, in a case where the target device classification model is stored in the memory 140 or in a memory (not shown) inside a IoT device, the voice-enabled device selecting apparatus 10 may classify the target devices by using the target device classification model stored in the memory 140 or in a memory (not shown) inside a IoT device, and therefore may obtain a list of target devices. Specifically, the processor 170 may classify the target devices by using the target device classification model stored in the memory 140 or in a memory (not shown) inside a IoT device, and therefore may obtain a list of target devices.

For example, in a case where the target device classification model is stored in the AI device 20, the voice-enabled device selecting apparatus 10 may ask the AI device 20 for a list of target devices, the AI device 20 may then classify the target devices by using the target device classification model, and the voice-enabled device selecting apparatus 10 may then obtain the list of target devices from the AI device 20. Specifically, the processor 170 may ask the AI device 20 for a list of target device through the communication unit 220 and obtain the list of target devices from the AI device 20 through the communication unit 220.

For example, in a case where the target device classification model is stored in a 5G network, the voice-enabled device selecting apparatus 10 may ask the 5G network for a list of target devices, the 5G network may then classify the target devices by using the target device classification model, and the voice-enabled device selecting apparatus 10 may then obtain the list of target devices from the 5G network. Specifically, the processor 170 may ask the 5G network for a list of target device through the communication unit 220 and obtain the list of target devices from the 5G network through the communication unit 220.

Next, the voice-enabled device 10 may ask at least one IoT device included in the list of target devices, among the first device and the at least one second device, for a voice signal that has been recognized by each IoT device. Specifically, the processor 170 may ask at least one IoT device included in the list of target devices, among the first device and the at least one second device, for a voice signal that has been recognized by each IoT device in the time slot during which the wakeup word has been recognized, through the communication unit 220.

For example, the voice-enabled device selecting apparatus 10 may receive, from an IoT device that has recognized the wakeup word, a voice signal indicating that the corresponding IoT device has recognized the wakeup word. Moreover, the voice-enabled device selecting apparatus 10 may receive, from an IoT device that has not recognized the wakeup word, a voice signal indicating that the corresponding IoT device has recognized ambient sound during the previous time slot. Specifically, the processor 170 may receive the voices signals recognized by each IoT device through the communication unit 220.

Next, according to the exemplary embodiment of the present invention, the voice-enabled device selecting apparatus 10 may select a response device (voice-enabled device) based on the voice signals received from some IoT devices among the first and second devices (S750).

For example, the voice-enabled device selecting apparatus 10 may analyze a plurality of voice signals received from some IoT devices among the first and second devices and select the IoT device closest to the position where the wakeup word is spoken (or the user 1000's position) as a response device (voice-enabled device) that will respond to the wakeup word, from among the some of the first and second devices. Specifically, the processor 170 may analyze a plurality of voice signals received from some IoT devices among the first and second devices and select the IoT device closest to the position where the wakeup word is spoken (or the user 1000's position) as a response device (voice-enabled device) that will respond to the wakeup word, from among the some of the first and second devices.

Lastly, according to the exemplary embodiment of the present invention, the voice-enabled device selecting apparatus 10 may transmit an activation request to the selected response device (voice-enabled device) (S770).

For example, the voice-enabled device selecting apparatus 10 may transmit, to the selected response device (voice-enabled device), an activation request that triggers a response ("ding" sound output) to the wakeup word ("Hi LG") spoken by the user 1000. Specifically, the processor 170 may transmit, to the selected response device (voice-enabled device) through the communication unit 220, an activation request that triggers a response ("ding" sound output) to the wakeup word ("Hi LG") spoken by the user 1000.

FIG. 8 is a flowchart for explaining an example of obtaining voice signals from some of a plurality of IoT devices according to an exemplary embodiment of the present invention.

As shown in FIG. 8, according to the exemplary embodiment of the present invention, the voice-enabled device selecting apparatus 10 may perform the voice signal obtaining step S730 of FIG. 7 through the second device searching step S731, target device selecting step S733, voice signal requesting step S735, and voice signal receiving step S737. A detailed description of this will be given below.

According to the exemplary embodiment of the present invention, upon obtaining wakeup word recognition information from a first device as in the step S710 of FIG. 7, the voice-enabled device selecting apparatus 10 may search for second devices registered to the same account as the first device (S731). Specifically, the processor 170 of the voice-enabled device selecting apparatus 10 may search for second devices registered to the same account as the first device.

A method for searching for second devices registered to the same account as the first device is identical to what has been described with reference to the step S730 of FIG. 7, so redundant description will be omitted.

According to the exemplary embodiment of the present invention, after searching for second devices, the voice-enabled device selecting apparatus 10 may select target devices from among the first device and second devices by using a pre-trained model (S733).

For example, the pre-trained model may be a target device classification model which is trained to classify target devices among the first device and second devices. For example, the target device classification model may define recognition situation information of each IoT device including the first device and second devices on an input feature map and define the probability of each IoT device's activation on an output feature map. Here, it should be noted that the pre-trained model may be stored in the memory 140, AI device 20, or 5G network as explained with reference to FIG. 7.

Here, the recognition situation information may include information on each IoT device's recognition rate of a wakeup word, information on noise received by each IoT device in the corresponding situation, information on each IoT device's activation history, and information on the activation history of a user account set up for the current user.

For example, the voice-enabled device selecting apparatus 10 may obtain information on each IoT device's recognition rate, noise information, and activation history information from each IoT device. As another example, the voice-enabled device selecting apparatus 10 may obtain information on each IoT device's recognition rate, noise information, and activation history information from the memory 140. The voice-enabled device selecting apparatus 10 may obtain information on each IoT device's recognition rate, noise information, and activation history information from the 5G network.

For example, the voice-enabled device selecting apparatus 10 may obtain information on the activation history of a user account set up for the current user from the memory 140. As another example, the voice-enabled device selecting apparatus 10 may obtain information on the activation history of a user account set up for the current user from an external device (e.g., product registration server). As another example, the voice-enabled device selecting apparatus 10 may obtain information on the activation history of a user account set up for the current user from the 5G network.

In a case where the pre-trained model is stored in the memory 140, the voice-enabled device selecting apparatus 10 may apply obtained recognition situation information to the pre-trained model, obtain the probability of each IoT device's activation as an output, and select IoT devices whose probability of activation is higher than a threshold as target devices.

In a case where the pre-trained model is stored in an external device (the AI device 20 or 5G network), the voice-enabled device selecting apparatus 10 may, for example, obtain the probability of each IoT device's activation from the external device, create a list of target devices including IoT devices whose probability of activation is higher than a threshold, and select devices in the list as target devices. As another example, the voice-enabled device selecting apparatus 10 may obtain the list of target devices created by the external device and select devices in the list as target devices.

According to the exemplary embodiment of the present invention, after selecting target devices, the voice-enabled device selecting apparatus 10 may ask the target devices for voice signals (S735).

According to the exemplary embodiment of the present invention, after asking the target devices for voice signals, the voice-enabled device selecting apparatus 10 may receive a voice signal (which may contain a wakeup word or not) recognized by each device from the target devices (S737). For example, a voice signal received from the first device which has recognized the wakeup word may include a voice signal indicating that the wakeup word has been recognized, and voice signals received from the other devices which have not recognized the wakeup word may not include a voice signal indicating that the wakeup word has been recognized, as explained with reference to FIG. 7.

Meanwhile, it is apparent that the steps S731 to S737 of FIG. 8 may be performed by AI processing of the processor 170 of the voice-enabled device selecting apparatus 10. While the foregoing description has been given of an example in which an operation of classifying target devices through AI processing is implemented in the processing operation of the voice-enabled device selecting apparatus 10, the present invention is not limited thereto. For example, the AI processing may be performed on the 5G network based on the recognition situation information transmitted from the voice-enabled device selecting apparatus 10. As another example, the AI processing may be performed on the AI device 20 based on the recognition situation information received from the voice-enabled device selecting apparatus 10.

FIG. 9 is a flowchart for explaining an example of selecting some of found devices as target devices by using AI processing according to an exemplary embodiment of the present invention.

As shown in FIG. 9, according to the exemplary embodiment of the present invention, the voice-enabled device selecting apparatus 10 may perform the target device selecting step S733 of FIG. 8 through the steps S7311A to S7311D of asking for recognition situation information, the steps S7332A to S7332D of obtaining recognition situation information, the step S7333 of inputting into a classification model, the step S7334 of analyzing the probability of activation, and the step S7335 of selecting a device, which are illustrated in FIG. 9. A detailed description of this will be given below.

According to the exemplary embodiment of the present invention, first of all, the voice-enabled device selecting apparatus 10 may ask first and second devices for information on each IoT device's recognition rate for a wakeup word (S7331A). Subsequently, the voice-enabled device selecting apparatus 10 may obtain information on each IoT's device's recognition rate from the first and second devices (S7332A).

Furthermore, according to the exemplary embodiment of the present invention, the voice-enabled device selecting apparatus 10 may ask the first and second devices for information on noise received by each IoT device (S7331B). Subsequently, the voice-enabled device selecting apparatus 10 may obtain information on noise received by each IoT device from the first and second devices (S7332B).

Furthermore, according to the exemplary embodiment of the present invention, the voice-enabled device selecting apparatus 10 may ask the first and second devices for information on each IoT device's activation history (S7331C). Subsequently, the voice-enabled device selecting apparatus 10 may obtain information on each IoT device's activation history from the first and second devices (S7332C).

Furthermore, according to the exemplary embodiment of the present invention, the voice-enabled device selecting apparatus 10 may obtain the user 1000's activation history from the user 1000's account who has spoken a wakeup word (S7331D). For example, the voice-enabled device selecting apparatus 10 may identify the user 1000 who has spoken the wakeup word from a plurality of pre-stored user accounts by analyzing the wakeup word obtained from the first device. Subsequently, the voice-enabled device selecting apparatus 10 may determine which device(s) the user 1000 who has spoken the wakeup word preferred in the current time slot in the past (S7332D).

Next, according to the exemplary embodiment of the present invention, the voice-enabled device selecting apparatus 10 may input (apply) each device's obtained recognition situation information (the first and second devices' recognition rate, noise, and activation history, and the user 1000's preferred devices) into the target device classification model (S7333).

Subsequently, according to the exemplary embodiment of the present invention, the voice-enabled device selecting apparatus 10 may analyze the probability of activation of each of the first and second devices by using the target device classification model (S7334).

Lastly, according to the exemplary embodiment of the present invention, the voice-enabled device selecting apparatus 10 may select devices whose analyzed probability of activation is higher than a threshold as target devices from among the first and second devices (S7335).

FIG. 10 is a flowchart for explaining an example of selecting a voice-enabled device by using an obtained voice signal according to an exemplary embodiment of the present invention.

As shown in FIG. 10, according to the exemplary embodiment of the present invention, the voice-enabled device selecting apparatus 10 may perform the response device selecting step S750 of FIG. 7 through the voice signal analysis step S751, distance determination step S752, and response device selecting steps S753 and S754 of FIG. 10. A detailed description of this will be given below on the assumption that first and second devices are selected as target devices.

According to the exemplary embodiment of the present invention, first of all, the voice-enabled device selecting apparatus 10 may analyze a first voice signal obtained from the first device selected as a target device and analyze a second voice signal obtained from the second device selected as a target device (S751).

Next, according to the exemplary embodiment of the present invention, the voice-enabled device selecting apparatus 10 may determine the distance between the first device and the speech position and the distance between the second device and the speech position, based on the results of analysis of the first voice signal and second voice signal (S752).

For example, the voice-enabled device selecting apparatus 10 may analyze a sampled value of the first voice signal of digital form and calculate the distance between the first device which has recognized the first voice signal and the speech position of the wakeup word. Likewise, the voice-enabled device selecting apparatus 10 may analyze a sampled value of the second voice signal of digital form and calculate the distance between the second device which has recognized the second voice signal and the speech position of the wakeup word.

If the distance between the first device and the speech position is higher than the distance between the second device and the speech position (that is, the second device is closer to the speech position than the first device), the voice-enabled device selecting apparatus 10 may select the second device as a response device (voice-enabled device) (S753).

In contrast, if the distance between the first device and the speech position is less than the distance between the second device and the speech position (that is, the first device is closer to the speech position than the second device), the voice-enabled device selecting apparatus 10 may select the first device as a response device (voice-enabled device) (S754).

The voice-enabled device selecting apparatus 10 may transmit an activation request to an IoT device selected as a response device, and the IoT device may output a response ("ding" sound) to the wakeup word upon receiving the activation request.

FIG. 11 shows an IoT system according to an exemplary embodiment of the present invention.

An IoT system 1 according to an exemplary embodiment of the present invention includes a plurality of IoT devices 31, 32, 33, and 34 which are able to recognize a wakeup word (Hi LG) from a user 1000 in the form of voice signal.

As shown in FIG. 11, according to the exemplary embodiment of the present invention, the IoT system 1 may include a voice-enabled device selecting apparatus 10 that obtains wakeup word recognition information from the device 32 which has recognized the wakeup word, among the plurality of IoT devices 31, 32, 33, and 34, asks some of at least one IoT device registered to the same user account as the device 32 which has recognized the wakeup word for a voice signal each IoT device has recognized, and selects a voice-enabled device (response device) from among the at least one IoT device based on the voice signals obtained from some of the IoT devices.

In FIG. 11, the voice-enabled device selecting apparatus 10 may be a separate device from the plurality of IoT devices 31, 32, 33, and 34. That is, the voice-enabled device selecting apparatus 10 may be a separate IoT device (e.g., home robot) from the plurality of IoT devices 31, 32, 33, and 34, or may be in the form of a home IoT server.

In FIG. 11, the voice-enabled device selecting apparatus 10 may be located in the same space (e.g., home) as the plurality of IoT devices 31, 32, 33, and 34 or in other spaces (e.g., outdoors).

FIG. 12 shows an IoT system according to another exemplary embodiment of the present invention.

An IoT system 2 according to another exemplary embodiment of the present invention includes a plurality of IoT devices 231, 232, 233, and 234 which are able to recognize a wakeup word (Hi LG) from a user 2000 in the form of voice signal.

As shown in FIG. 12, according to the exemplary embodiment of the present invention, the IoT system 2 may include a voice-enabled device selecting apparatus 210 that obtains wakeup word recognition information from the device 232 which has recognized the wakeup word, among the plurality of IoT devices 231, 232, 233, and 234.

In FIG. 12, the voice-enabled device selecting apparatus 210 may ask a production registration server 240 for a list of at least one IoT device registered to the same user account as the device 232 which has recognized the wakeup word.

The product registration server 240 may store a list of a plurality of user accounts registered as users in the IoT system 2 in an internal memory (not shown). Also, the product registration server 240 may store a list of IoT devices registered for each of a plurality of users registered in the IoT system 2 in an internal memory (not shown).

Upon receiving from the voice-enabled device selecting apparatus 210 a request for a list of at least one IoT device registered to the same user account as the device 232 which has recognized the wakeup word, the product registration server 240 may transmit to the voice-enabled device selecting apparatus 210 the list of IoT devices registered in the user 2000's user account that is stored in an internal memory (not shown).

In FIG. 12, the voice-enabled device selecting apparatus 210 may ask some of the IoT devices registered to the user 2000's user account obtained from the product registration server 240 for a voice signal each IoT device has recognized, and select a voice-enabled device (response device) from among at least one IoT device based on the voice signals obtained from the some IoT devices.

In FIG. 12, the voice-enabled device selecting apparatus 210 and the product registration server 240 may be separate apparatuses from the plurality of IoT devices 31, 32, 33, and 34. That is, the voice-enabled device selecting apparatus 210 and the product registration server 240 may be separate IoT devices (e.g., home robots) from the plurality of IoT devices 31, 32, 33, and 34, or may be in the form of a home IoT server.

In FIG. 12, the voice-enabled device selecting apparatus 210 and the product registration server 240 may be located in the same space (e.g., home) as the plurality of IoT devices 31, 32, 33, and 34 or in other spaces (e.g., outdoors).

FIG. 13 shows an IoT system according to yet another exemplary embodiment of the present invention.

An IoT system 3 according to yet another exemplary embodiment of the present invention includes a plurality of IoT devices 331, 332, 333, and 334 which are able to recognize a wakeup word (Hi LG) from a user 3000 in the form of voice signal.

As shown in FIG. 13, according to the exemplary embodiment of the present invention, the main IoT device 334 among the plurality of IoT devices 331, 332, 333, and 334 of the IoT system 3 may obtain wakeup word recognition information from the device 332 which has recognized the wakeup word, ask some of at least one IoT device registered to the same user account as the device 332 which has recognized the wakeup word for a voice signal each IoT device has recognized, and select a voice-enabled device (response device) from among the at least one IoT device 331, 332, and 333 based on the voice signals obtained from the some of the IoT devices.

In FIG. 13, the main IoT device 334 may be the same IoT device as the other at least one IoT device 331, 332, and 333.

FIG. 14 is a flowchart showing an AI processing process between a 5G network and a voice-enabled device selecting apparatus according to an exemplary embodiment of the present invention.

As shown in FIG. 14, the voice-enabled device selecting apparatus 10 may receive wakeup word recognition information from IoT devices (S1410).

Upon receiving wakeup word recognition information from IoT devices, the voice-enabled device selecting apparatus 10 may ask each IoT device for recognition situation information (S1420), and may obtain recognition situation information (e.g., each device's recognition rate, obtained noise, and activation history) from each IoT device as a response to the request (S1430). Moreover, the voice-enabled device selecting apparatus 10 may determine which devices the user prefers in the current time slot, based on the user's activation history stored in the memory 140 of the voice-enabled device selecting apparatus 10.

The voice-enabled device selecting apparatus 10 may transmit the recognition situation information to an AI processor included in a 5G network (S1440).

Here, the processor 170 may control a communication unit 220 to transmit the recognition situation information to the AI processor included in the 5G network. Also, the processor 170 may control the communication unit 220 to receive AI-processed information from the AI processor.

The AI-processed information may be information about each device's recognition rate, noise, and activation history, and the user's preferred devices.

Meanwhile, the voice-enabled device selecting apparatus 10 may perform an initial access procedure with the 5G network, in order to transmit the recognition situation information to the 5G network. The voice-enabled device selecting apparatus 10 may perform an initial access procedure with the 5G network based on a synchronization signal block (SSB).

Moreover, the voice-enabled device selecting apparatus 10 may receive, from the network through a wireless communication unit, downlink control information (DCI) which is used to schedule the transmission of the recognition situation information obtained by the voice-enabled device selecting apparatus 10.

That is, the processor 170 may transmit the recognition situation information to the network based on the DCI.

The recognition situation information may be transmitted to the network via a PUSCH, and the SSB and the DM-RS of the PUSCH may be quasi co-located with QCL type D.

Here, the 5G network may include an AI processor or AI system.

The AI system of the 5G network may perform AI processing based on received recognition situation information (S1450).

Specifically, the AI system on the 5G network may input the recognition situation information received from the voice-enabled device selecting apparatus 10 into a target device classification model (S1451). The AI system may analyze the probability of each IoT device's activation based on input information such as the recognition rate, noise, and device activation history, and the user's preferred devices (S1452), and may output the probability of each IoT device's activation based on an output value from the target device classification model (S1453). The 5G network may transmit the probability of each device's activation determined by the AI system to the voice-enabled device selecting apparatus 10 through a wireless communication unit.

Here, the probability of each device's activation may refer to the probability that each device is activated in the corresponding time slot during which a wakeup word from the user who has spoken the wakeup word has been recognized.

The voice-enabled device selecting apparatus 10 may receive the probability of each device's activation from the 5G network (S1460).

The voice-enabled device selecting apparatus 10 may select devices whose probability of activation is higher than a threshold as target devices and ask the selected target devices for voice signals (S1470).

Meanwhile, the voice-enabled device selecting apparatus 10 may obtain the probability of each device's activation and also obtain a list of target devices determined by the AI system included in the 5G network based on the probability of each device's activation.

Advantageous effects of the method and apparatus for selecting a voice-enabled device according to the present invention will be described below.

In the present invention, even if the closest device the user intends to activate is not able to recognize a wakeup word spoken by the user due to the device's microphone position, that device may be selected as a voice-enabled device.

In the present invention, even if a device the user intends to activate is not able to recognize a wakeup word spoken by the user depending on its sensitivity to the wakeup word or its algorithm type, that device may be selected as a voice-enabled device.

The above-described invention may be implemented in computer-readable code in program-recorded media. The computer-readable media include all types of recording devices storing data readable by a computer system. Example computer-readable media may include hard disk drives (HDDs), solid state disks (SSDs), silicon disk drives (SDDs), ROMs, RAMs, CD-ROMs, magnetic tapes, floppy disks, and/or optical data storage, and may be implemented in carrier waveforms (e.g., transmissions over the Internet). The foregoing detailed description should not be interpreted not as limiting but as exemplary in all aspects. The scope of the present invention should be defined by reasonable interpretation of the appended claims and all equivalents and changes thereto should fall within the scope of the invention.

What is claimed is:

1. A method for a voice-enabled device to select a voice-enabled device, the method comprising:
obtaining information related to recognition of a wakeup word by a first device;
obtaining at least one voice signal recognized by at least one among the first device and second devices registered to the same account as the first device; and
selecting a device that will respond to the wakeup word based on the at least one voice signal,
wherein the selecting of the voice-enabled device comprises selecting the device closest to the position where the wakeup word is spoken by analyzing the at least one voice signal.

2. The method of claim 1, wherein the obtaining of a voice signal(s) comprises selecting at least one device to ask for a voice signal from among the first and second devices by using a pre-trained classification model.

3. The method of claim 2, wherein the obtaining of a voice signal(s) comprises:
   obtaining the probability of activation of each of the first and second devices by using the classification model; and
   selecting at least one device to ask for a voice signal from among the first and second devices based on the probability of activation.

4. The method of claim 3, wherein the probability of activation is obtained by applying recognition situation information related to the first device, the second devices, and the user's account who has spoken the wakeup word.

5. The method of claim 4, wherein the recognition situation information comprises at least one of the following:
   information on the recognition rate for a voice signal recognized by each of the first and second devices;
   information on noise contained in the voice signal recognized by each of the first and second devices;
   information on the activation history of each of the first and second devices; and
   information on the user's activation history.

6. An apparatus for selecting a voice-enabled device, the apparatus comprising:
   a communication module for obtaining information indicating that a first device has recognized a wakeup word; and
   a processor for controlling the communication module to obtain at least one voice signal recognized by at least one among the first device and second devices registered to the same account as the first device and for selecting a device that will respond to the wakeup word based on the at least one voice signal,
   wherein the processor selects the device closest to the position where the wakeup word is spoken by analyzing the at least one voice signal.

7. The apparatus of claim 6, wherein the processor selects at least one device to ask for a voice signal from among the first and second devices by using a pre-trained classification model.

8. The apparatus of claim 7, wherein the processor obtains the probability of activation of each of the first and second devices by using the classification model, and selects at least one device to ask for a voice signal from among the first and second devices based on the probability of activation.

9. The apparatus of claim 8, wherein the probability of activation is obtained by applying recognition situation information related to the first device, the second devices, and the user's account who has spoken the wakeup word.

10. The apparatus of claim 9, wherein the recognition situation information comprises at least one of the following:
   information on the recognition rate for a voice signal recognized by each of the first and second devices;
   information on noise contained in the voice signal recognized by each of the first and second devices;
   information on the activation history of each of the first and second devices; and
   information on the user's activation history.

* * * * *